(12) United States Patent
Pavel et al.

(10) Patent No.: US 8,135,543 B2
(45) Date of Patent: Mar. 13, 2012

(54) APPARATUS AND METHOD FOR INTEGRATING SURVEY PARAMETERS INTO A HEADER

(75) Inventors: Dennis R. Pavel, Highland Village, TX (US); Keith Elder, Richmond, TX (US); Richard Eperjesi, Stafford, TX (US); Gregg S. Hofland, Parker, CO (US); Martin C. Williams, Boulder, CO (US); Scott T. Hoenmans, Arvada, CO (US); Andrew Bull, Murieston (GB); Alan Faichney, Edinburgh (GB)

(73) Assignee: Inova Ltd., Houston, TX (US)

( * ) Notice: Subject to any disclaimer, the term of this patent is extended or adjusted under 35 U.S.C. 154(b) by 0 days.

(21) Appl. No.: 13/006,196

(22) Filed: Jan. 13, 2011

(65) Prior Publication Data

US 2011/0125407 A1 May 26, 2011

Related U.S. Application Data

(63) Continuation of application No. 11/760,451, filed on Jun. 8, 2007, now abandoned.

(60) Provisional application No. 60/812,568, filed on Jun. 10, 2006.

(51) Int. Cl.
*G01V 1/30* (2006.01)
(52) U.S. Cl. ............................ 702/14; 367/60; 367/77
(58) Field of Classification Search ............... 702/5, 14, 702/16–18, 187; 181/106, 108, 111, 112, 181/122; 367/14, 25, 36, 37, 60, 76, 77
See application file for complete search history.

(56) References Cited

U.S. PATENT DOCUMENTS

| | | | |
|---|---|---|---|
| 3,733,584 A | | 5/1973 | Pelton et al. |
| 3,806,864 A | * | 4/1974 | Broding et al. ............ 367/77 |
| 3,886,494 A | | 5/1975 | Kostelnicek et al. |
| 4,086,504 A | | 4/1978 | Ezell et al. |
| 4,236,234 A | | 11/1980 | McDavid et al. |

(Continued)

FOREIGN PATENT DOCUMENTS

EP 0250280 A1 12/1987

(Continued)

OTHER PUBLICATIONS

408UL Reference Training Guide, Firmware Network Description, Jan. 13, 2011, pp. Jan. 13, 2000 pp. 13-1 to 13-18.

(Continued)

*Primary Examiner* — Manuel L Barbee
(74) *Attorney, Agent, or Firm* — Mossman, Kumar & Tyler, PC (57) ABSTRACT

A method, apparatus and system for acquiring seismic data is disclosed that in one aspect receives a seismic signal detected by at least one sensor in response to a seismic energy signal generated by a source at a selected location at a data acquisition unit in data that is in data communication with the sensor, receives at least one parameter of the source and/or receiver at the data acquisition unit; and generates a data block at the data acquisition unit having data representative of the received seismic signal and a header that contains data representative of the at least one parameter of the source and/or receiver. It is emphasized that this abstract is provided to comply with the rules requiring an abstract which will allow a searcher or other reader to quickly ascertain the subject matter of the technical disclosure.

8 Claims, 7 Drawing Sheets

U.S. PATENT DOCUMENTS

| | | | |
|---|---|---|---|
| 4,296,485 A | 10/1981 | Clemens |
| 4,297,700 A | 10/1981 | Nard et al. |
| 4,366,561 A | 12/1982 | Klein |
| 4,628,494 A | 12/1986 | Rialan et al. |
| 4,639,901 A | 1/1987 | Warmack et al. |
| 4,644,506 A | 2/1987 | Cretin et al. |
| 4,725,992 A | 2/1988 | McNatt et al. |
| 4,807,200 A | 2/1989 | Montes et al. |
| 4,814,711 A | 3/1989 | Olsen et al. |
| 4,815,944 A | 3/1989 | Maruyama et al. |
| 4,885,724 A | 12/1989 | Read et al. |
| 4,905,205 A | 2/1990 | Rialan |
| 4,908,803 A | 3/1990 | Rialan |
| 4,967,400 A | 10/1990 | Woods |
| 4,979,152 A | 12/1990 | Rialan et al. |
| 5,189,642 A | 2/1993 | Donoho et al. |
| 5,206,835 A | 4/1993 | Beauducel |
| 5,276,655 A | 1/1994 | Rialan et al. |
| 5,351,244 A | 9/1994 | Rialan et al. |
| 5,363,094 A | 11/1994 | Staron et al. |
| 5,396,246 A | 3/1995 | Coquerel |
| 5,481,502 A | 1/1996 | Cretin et al. |
| 5,550,787 A | 8/1996 | Rialan et al. |
| 5,563,847 A | 10/1996 | Grouffal et al. |
| 5,617,371 A | 4/1997 | Williams |
| 5,623,455 A | 4/1997 | Norris |
| 5,627,798 A | 5/1997 | Siems et al. |
| 5,629,905 A * | 5/1997 | Lau ................................ 367/54 |
| 5,681,008 A | 10/1997 | Kinstler |
| 5,706,250 A | 1/1998 | Rialan et al. |
| 5,724,241 A | 3/1998 | Wood et al. |
| 5,745,074 A | 4/1998 | Laude |
| 5,822,273 A | 10/1998 | Bary et al. |
| 5,829,520 A | 11/1998 | Johnson |
| 5,959,529 A | 9/1999 | Kail |
| 5,978,313 A | 11/1999 | Longaker |
| 6,002,640 A | 12/1999 | Harmon |
| 6,002,641 A | 12/1999 | Chien |
| 6,023,444 A | 2/2000 | Naville et al. |
| 6,061,299 A | 5/2000 | Grouffal et al. |
| 6,070,129 A | 5/2000 | Grouffal |
| 6,078,283 A | 6/2000 | Bednar |
| 6,208,247 B1 | 3/2001 | Agre et al. |
| 6,208,626 B1 | 3/2001 | Brewer |
| 6,219,620 B1 | 4/2001 | Park et al. |
| 6,226,601 B1 | 5/2001 | Longaker |
| 6,255,962 B1 | 7/2001 | Tanenhaus et al. |
| 6,255,969 B1 | 7/2001 | Crayford |
| 6,322,109 B1 | 11/2001 | Campbell et al. |
| 6,353,577 B1 | 3/2002 | Orban et al. |
| 6,430,106 B1 | 8/2002 | Staron |
| 6,469,639 B2 | 10/2002 | Tanenhaus et al. |
| 6,553,316 B2 | 4/2003 | Bary et al. |
| 6,560,565 B2 | 5/2003 | Roy et al. |
| 6,898,529 B2 | 5/2005 | Gao et al. |
| 6,944,096 B2 | 9/2005 | Lemenager et al. |
| 6,977,867 B2 | 12/2005 | Chamberlain |
| 7,034,711 B2 | 4/2006 | Sakatani et al. |
| 7,050,355 B2 | 5/2006 | Robertsson et al. |
| 2001/0030907 A1 | 10/2001 | Bachrach |
| 2003/0198132 A1 | 10/2003 | Kappius et al. |
| 2004/0156267 A1 | 8/2004 | O'Brien et al. |
| 2004/0252585 A1 | 12/2004 | Smith et al. |
| 2004/0257913 A1 | 12/2004 | Ray et al. |
| 2004/0267499 A1 | 12/2004 | Barnes |
| 2005/0083784 A1 * | 4/2005 | Iseli et al. ................. 367/60 |
| 2005/0177310 A1 | 8/2005 | Duncan et al. |
| 2005/0276162 A1 | 12/2005 | Brinkmann et al. |
| 2006/0086497 A1 | 4/2006 | Ohmer et al. |
| 2006/0145881 A1 | 7/2006 | Sakatani et al. |

FOREIGN PATENT DOCUMENTS

| | | |
|---|---|---|
| EP | 0552769 A1 | 7/1993 |
| WO | WO 98/12577 A1 | 3/1998 |
| WO | WO 98/18022 A1 | 4/1998 |
| WO | WO 99/60424 A1 | 11/1999 |

OTHER PUBLICATIONS

SGR II, Seismic Group Recorder System: High Technology with a track record, Global Universal Sciences, Inc. 1984 pp. 1-6.

SGR III, Seismic Group Recorder System, Global Universal Systems, Inc. 1985, pp. 1-4.

LaCosta & Romberg—Scintrex, Inc. Quarterly, vol. 1, Issue 3, May 12, 2003, What's Happening at LRS?, pp. 1-4.

* cited by examiner

APPARATUS AND METHOD FOR INTEGRATING SURVEY PARAMETERS INTO A HEADER

CROSS REFERENCE TO RELATED APPLICATIONS

This application is a continuation of U.S. patent application Ser. No. 11/760,451 filed Jun. 8, 2007, which claims priority from U.S. Provisional Patent Application Ser. No. 60/812,568, filed on Jun. 10, 2006.

FIELD OF THE DISCLOSURE

The disclosure relates generally to devices, systems and methods relating to seismic surveying and for integrating one or more survey parameters into trace headers.

BACKGROUND INFORMATION

Seismic surveys are conducted on land and over water to obtain images of subsurface formations to determine the location and extent of hydrocarbons, such as oil and gas. Seismic surveys are typically conducted over land by deploying a large array of seismic sensors over a surface portion of the earth. Typically, such arrays cover several square kilometers, for example 75-100 square kilometers, utilizing a few thousand, for example 2000 to 5000, seismic receivers or sensors. An energy source (typically a buried explosive source or a mobile vibratory source) is activated within the array to generate an acoustic energy (a shock wave) that propagates through the subsurface structures of the earth. A portion of the acoustic wave is reflected back to the surface from underground discontinuities, such as at where the formation rock structure changes and at oil and gas reservoir interfaces. These reflections are sensed by the sensors in the sensor array and processed and recorded by data acquisition units placed proximate the sensors. The data from the recorders is typically collected and sent to a central station for further processing. Such sensing, processing and recording are typically referred to as seismic data acquisition. Seismic data acquisition also is performed in a passive mode, i.e., recording of seismic signals received from the earth subsurface structures without the use of an active acoustic energy source.

A three-dimensional map, or seismic image, of the subsurface structures is generated from the sensor data received by moving the energy source to different locations in the array. This map is then used to make decisions about drilling locations, reservoir size, pay zone depth, etc. The quality and resolution of the seismic image depends upon the density of sensors in the array. Typically greater sensor density, i.e., greater number of sensors in the array, provides sharper and clearer images. Geophones or multi-component (three-axis) accelerometers are generally used as seismic sensors. Multi-component recording, however, provides higher sensor density than single component sensors and also higher amounts of data that is processed and recorded by the data acquisition units in the field.

In one type of seismic surveying, sensor arrays typically include sensors connected in a matrix using point-to-point cable connections for all of the sensors. Output signals from the sensors are usually digitized and relayed down the cable lines to a high-speed backbone field processing devices or field boxes. The high-speed backbone is typically connected in a point-to-point relay fashion with other field boxes and then to a central recording system where all of the data are recorded onto a mass data storage medium, such as a magnetic tape.

In another seismic data acquisition system configuration, the data is recorded at the field boxes coupled to the sensors and such field boxes communicate with the central control unit over a radio frequency. The data from such field boxes is typically collected by a transcriber in the field and transferred to the central control unit.

To perform a seismic survey, a survey plan is made that includes the location of each sensor in the array and the location of each source shot. The actual location of the shots may differ because it is not feasible to activate a source at the planned location or that even after locating a stake at such location, such stakes are moved, knocked down, and/or blown over, and/or removed and/or destroyed completely. Even if the stake marker is accurate, the actual seismic source may be positioned inaccurately. Navigation tools, such as geo-positioning tools, are used to record the actual sensor and source shot locations. The source parameters are maintained at a data collection point or at a central controller and entered into the trace data after collecting such from the various data acquisition units. The pre-processing task of entering the source, receiver and other parameters, such as spatial coordinates, etc. for each trace data can be arduous, time-consuming, and prone to errors.

Thus, there is a need for an improved method and system for associating the source parameters with the sensor data during seismic data acquisition.

SUMMARY OF THE PRESENT DISCLOSURE

The present disclosure provides, in one aspect, a method for associating data relating to one or more seismic source parameters with the acquired seismic data during the acquisition of the seismic data. In one aspect, the method may include receiving seismic signals at a receiver in the field in response to activating a source at a selected location; processing the received signals at a filed data acquisition unit and recording the processed signals at the recorder; receiving at the field data acquisition unit one or more parameters of the source and/or the receiver; associating the one or more parameters of the source and/or receiver with the recorded processed signals; recording the associated one or more parameters of the source and/or receiver along with the recorded processed signals; and transferring the recorded processed signals and the one or more parameters of the source and/or receiver to a another unit for processing. In one aspect, the field data acquisition unit may associate the one or more parameters of the source and/or receiver with the recoded processed signals by including the one or more parameters of the source and/or receiver into a header of a data block or packet that is formed to contain the processed signals. The field data acquisition unit may transfer the data blocks to a data collection station or to a processing center via a suitable communication link, including a cable connection or a wireless link.

In another aspect, a data acquisition unit is provided that includes a processor that: processes signals received from one or more seismic sensors; receives source and/or receiver parameters; and associates the source and/or receiver parameters with the processed signals; and records the associated source parameters along with the processed signals.

It should be understood that examples of some of the features of the present disclosure have been summarized rather broadly in order that detailed description thereof that follows may be better understood, and in order that the contributions to the art may be appreciated. There are, of course, additional features of the present disclosure that will be described hereinafter and will form the subject matter of the claims appended hereto.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, wherein:

It is to be noted, however, that the appended drawings illustrate only typical embodiments of the present claimed subject matter and are, therefore, not to be considered limiting of the scope of the present claimed subject matter, as the claimed subject matter may admit to other equally effective embodiments.

DETAILED DESCRIPTION OF ILLUSTRATIVE EMBODIMENTS

Illustrative embodiments of the present claimed subject matter are described in detail below, in the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

Figure 1:
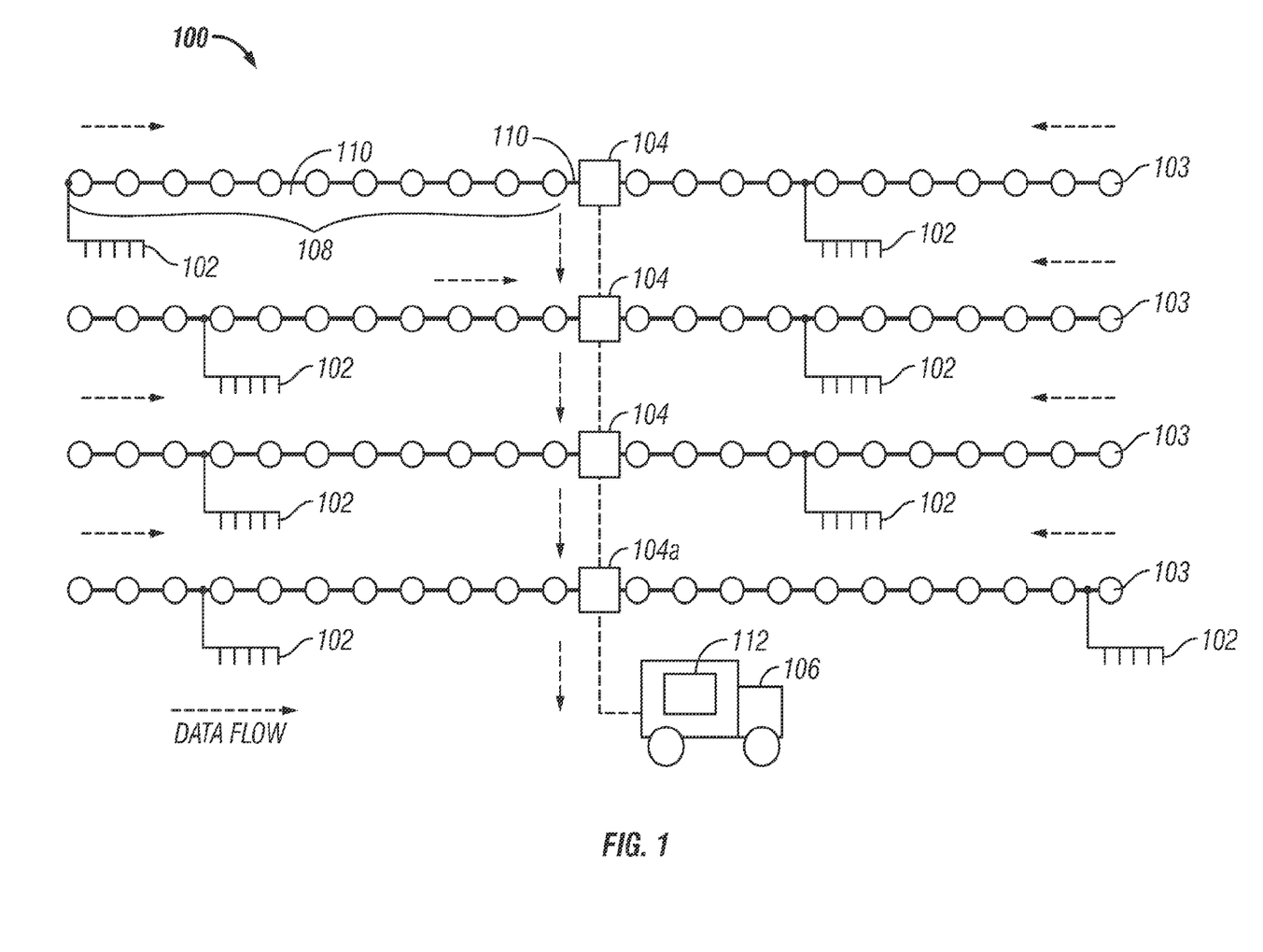
FIG. 1 schematically illustrates a representation of seismic surveying system that uses point-to-point line connections for connecting the field data acquisition units and the seismic sensors in which certain elements of the system are configured to implement one or more features of the disclosure.

FIG. 1 depicts a seismic data acquisition system 100, wherein certain elements of the system have been configured to implement one or more features of the disclosure. The typical system 100 includes an array (string) of spaced-apart seismic sensor units 102. Each string of the seismic sensor units 102 is typically coupled via cabling 110 to a data acquisition device (field box) 103, and several data acquisition devices (field boxes) 103 and the associated string of the seismic sensor units 102 are coupled via the cabling 110 to form a line 108, which is then coupled via the cabling 110 to a line tap or (cross-line unit) 104. Several cross-line units 104 and the associated lines 108 are usually coupled together and then to a central controller 106, the central controller 106 typically houses a main recorder system 112. The several cross-line units 104 and the associated lines 108 coupled together form an array (spread or seismic spread) 115 for seismic data acquisition. The typical seismic sensor unit 102 in use is a velocity geophone used to measure an acoustic wave velocity of an acoustic wave traveling in the earth. Recently, and as noted above, acceleration sensors (accelerometers) are finding more widespread acceptance for measuring acceleration associated with an acoustic wave. Each seismic sensor unit 102 might comprise a single sensor element or more than one sensor element for multi-component seismic sensor units 102.

The seismic sensor units 102 are usually spaced at least on the order of tens of meters, in a range, for example, from about four meters to seventy meters. The cross-line units 104 typically may perform some signal processing and then store the processed signals as seismic information for later retrieval as explained above. The cross-line units 104 are each coupled, either in parallel or in series, with one of the cross-line units 104a serving as an interface with between the central controller 106 and all the other cross-line units 104. In the cable system 100, data are relayed from one seismic sensor unit 102 to the next seismic sensor unit 102 and through the field boxes 103 hundreds of times before reaching the central controller 106 and the associated main recorder system 112.

Usually a surveying crew is employed to locate the planned position of the seismic sensor units 102 on the ground prior to laying out the acquisition equipment. A backpack global positioning system (GPS) receiver is then used by the surveyor and stakes are planted in the ground at each of thousands of the predetermined seismic sensor unit 102 locations. Therefore, array deployment in the typical system is a two-step process, adding time and labor costs to the seismic survey process. One or more of these sensor parameters determined in the field, in one aspect, are provided to the units 103, which units may incorporate such parameters and other sensor and source parameters received from the central unit 106 into the seismic trace data prior to transmitting such data to the central recorder 106. Thus, making the seismic data process-ready or substantially process-ready at the field acquisition units 103.

Figure 2:
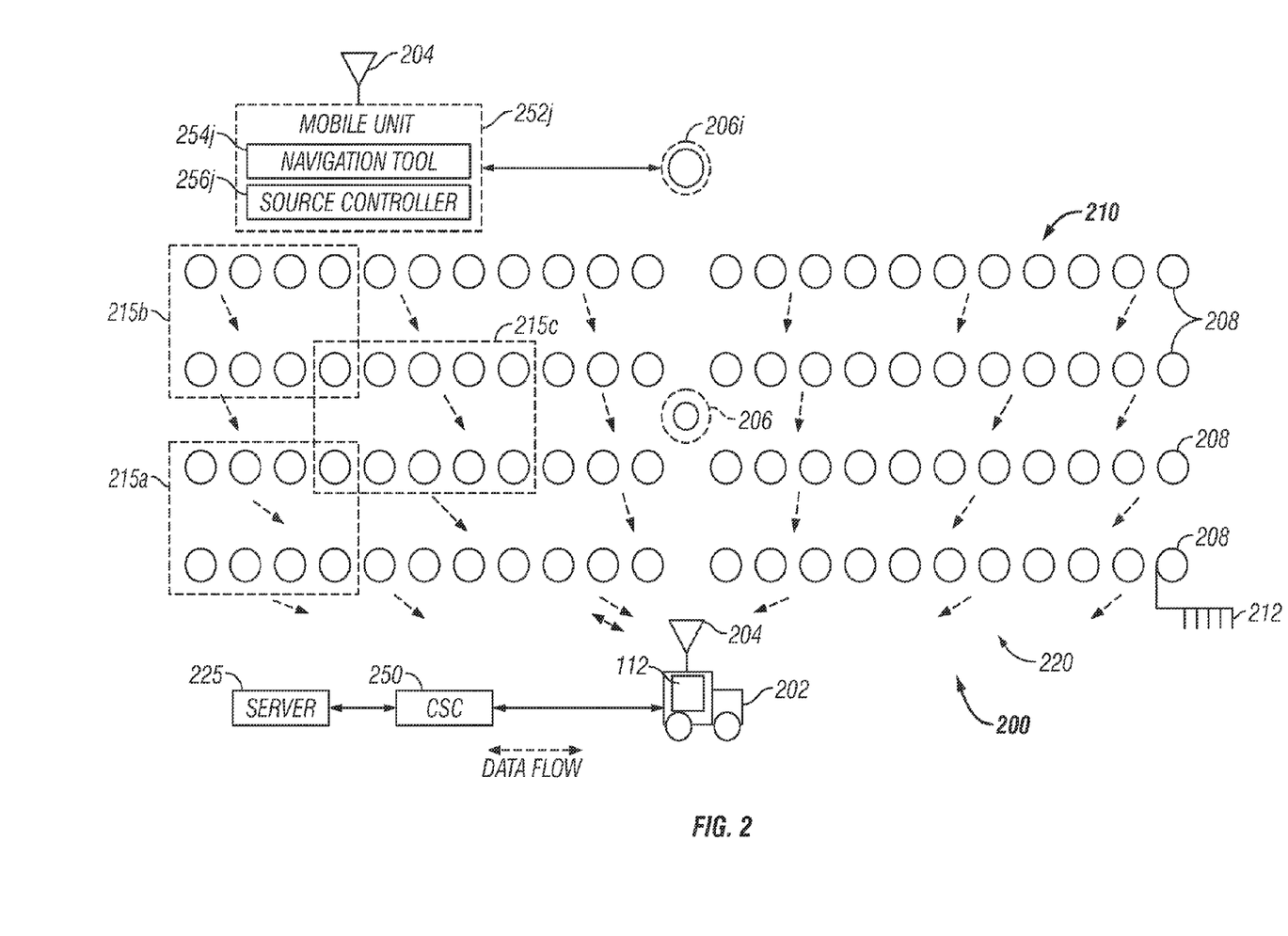
FIG. 2 schematically illustrates a representation of a seismic surveying system that utilizes wireless data acquisition units, in which system certain elements are configured to implement one or more features of the disclosure.

Referring first to FIG. 2, a conceptual representation of a seismic surveying system 200 is shown according to one exemplary embodiment of the present disclosure. The seismic surveying system 200 includes a central controller 202 in direct communication with at least one out of a number of wireless sensor stations 208 forming an array (spread) 210 for seismic data acquisition. Each wireless sensor station 208 includes one or more sensors 212 for sensing seismic energy. Direct communication as used herein refers to individualized data flow as depicted in FIG. 2 by dashed arrows 220. The data flow 220 can be bi-directional for allowing command and control instructions to be sent from the central controller 202 to each wireless sensor station 208 and for quality control and/or selected pre-processed seismic information to flow from each wireless sensor station 208 to the central controller 202. The communication might be in the form of radio signals transmitted and received at the central controller 202 via a suitable antenna 204. In various illustrative embodiments, central controller 202 may house a main recorder system 222. The seismic surveying system 200 may operate in a passive mode by sensing natural and/or random seismic energy traveling in the earth.

The seismic surveying system 200 may also operate in an active mode using a seismic energy source 206, for example, a pyrotechnic source, a vibrator source on a mobile unit, compressed gas, and the like, to provide seismic energy of a known magnitude and seismic energy source 206 location. In many applications, multiple seismic energy sources 206 may be utilized to impart seismic energy into a subterranean formation. A representative seismic energy source may be schematically illustrated as a seismic source 206i, where i may range from 1 to any finite integer, depending on the number of seismic sources 206i that may be included in the seismic surveying system 200, for example. In various illustrative embodiments, activation (or, more commonly, "shooting" and/or "firing") of the seismic source 206i may be initiated locally by a mobile unit 252j, where j may range from 1 to any finite integer, depending on the number of mobile units 252j that may be included in the seismic surveying system 200, for example.

The mobile unit 252j may include a human operator who utilizes a navigation tool 254j to navigate to the seismic source 206i and a source controller 256j to fire the seismic source 206i. To navigate the terrain and/or to determine precise location coordinates (for example, spatial coordinates, such as longitude, also known as the X-coordinate, and/or latitude, also known as the Y-coordinate, and/or elevation, above sea level, for example, also known as the Z-coordinate), the navigation tool 254j may be equipped with a global positioning satellite device (a GPS device) and/or a database having predetermined coordinates (for example, the elevations, above sea level, for example, also known as the Z-coordinates). The navigation tool 254j may also be configured to provide audible and/or visual signals such as alarms and/or status indications relating to the firing activity. The source controller 256j may be programmed to receive information, such as instructions to ready the seismic source 206i for firing, and/or to fire the seismic source 206, and/or to transmit information, such as the location of the mobile unit 252j, the arming status of the seismic source 206i, and/or data such as return shot attributes. The source controller 256j may also be programmed to fire the seismic source 206i and/or provide an indication (for example, visual and/or auditory) to the human operator as to the arming status of the seismic source 206i.

In various illustrative embodiments, two or more mobile units 252j may independently traverse the terrain underlying the array (spread) 210 to locate and/or fire the seismic sources 206i. In various illustrative embodiments, the source controller 256j may include a navigation device that transmits the GPS data to the central controller 202 and/or a central station computer (CSC) 250 (described in more detail below), either of which may transmit the "arm" and/or "fire" signals to the navigation device. These signals may be digital signals, in contrast to the voice signals currently in use. The navigation device may include a display to advise the shooter of the status of the firing activity.

The central controller 202, the CSC 250 and/or a central server 225 may exert control over the constituent components of the seismic surveying system 200 and/or direct both human and/or machine activity during the operation of the seismic surveying system 200. As discussed in greater detail below, the CSC 250 may automate the shooting of the seismic sources 206i and/or transmit data that enables the wireless sensor stations 208 to self-select an appropriate power usage state during such activity. The central server 225 may be programmed to manage data and/or activities over the span of the seismic surveying campaign, which may include daily shooting sequences, updating the shots acquired, tracking shooting assets, and/or broadcasting corrections. Alternatively, and/or additionally, a single central controller 202 may be programmed to handle most, if not all, of the above-described functions. For example, the CSC 250 may be positioned in, and/or be integral with, the central controller 202. Moreover, in some applications in various illustrative embodiments, it may be advantageous to position the central controller 202 and CSC 250 in the field, albeit in different locations, and the central server 225 at a still different and/or remote location.

Certain advantages may be apparent from the conceptual representation shown in FIG. 2. Among other things, the use of individual wireless sensor stations 208 to form the array (spread) 210 eliminates interconnecting cables, such as the cables 110 associated with the typical line 108, as described above and as shown in FIG. 1, for example. Elimination of these cables 110 provides the survey crew the option of moving individual wireless sensor stations 208 without affecting placement of other individual wireless sensor stations 208 in the array (spread) 210. Another advantage is the reduction of weight in the overall array (spread) 210. Another advantage is in the elimination of single-point failures that can cause information loss from at least an entire line of sensors. A failed cable or cable connector, a failed field box, or a failed cross-line unit in the typical system of FIG. 1 will cause such a loss of information. The single station radio architecture of the present invention provides independent communication paths between the acquisition units and the central recording system. The failure of a single radio acquisition unit causes data to be lost from only one station and recording can continue while it is repaired without loss of information from other sensor stations.

Figure 3A:
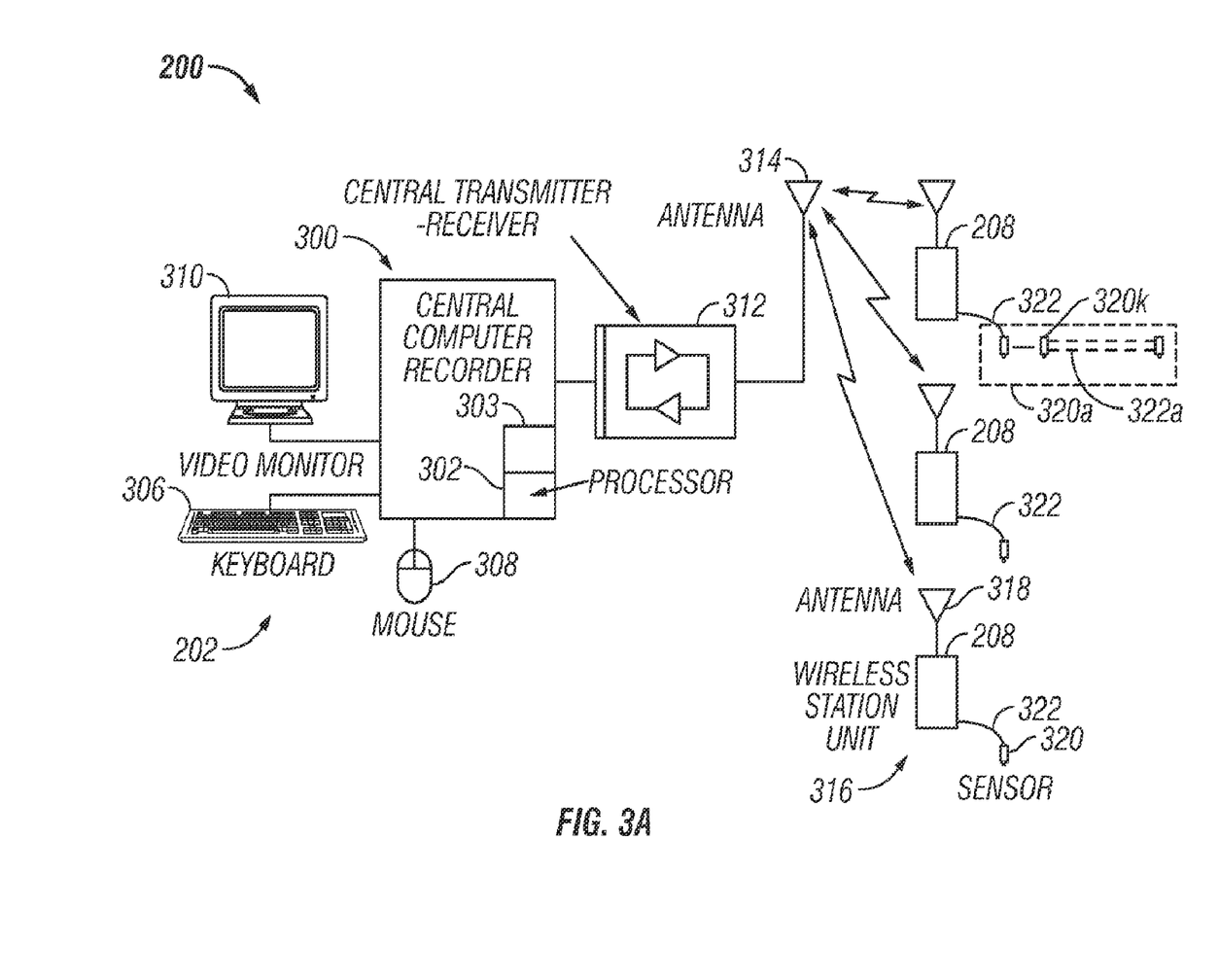
FIG. 3A schematically illustrates a schematic representation of one possible configuration of the system of FIG. 2 in more detail.

FIG. 3A is a schematic representation of the seismic surveying system 200 in more detail. The central controller 202 may include one or more computers 300, each having one or more processors 302 and one or more memory devices 303. An operator may interface with the seismic surveying system 200 using one or more keyboards 306 and/or one or more mice and/or other input devices 308 and one or more output devices such as one or more monitors 310. Communication between remotely-located seismic surveying system 200 components in the array (spread) 210 and the central controller 202 may be accomplished using at least one central transmitter-receiver (transceiver) unit 312 disposed in the central controller 202 along with at least one antenna 314.

Figure 3B:
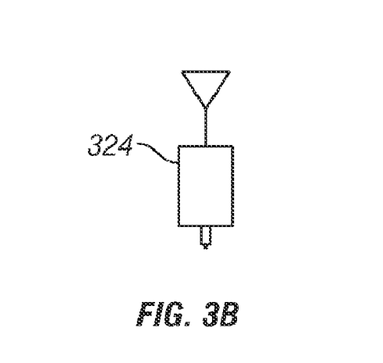
FIG. 3B schematically illustrates a wireless field data acquisition unit (or station) having an integrated seismic sensor according to one embodiment of the present disclosure.

The central controller 202 communicates with each wireless sensor station 208. Each wireless sensor station 208, as shown in FIG. 3A, for example, may include one or more wireless station units 316, at least one antenna 318 compatible with the at least one antenna 314 used with the central controller 202, and one or more sensor units 320, 320a responsive to acoustic energy traveling in the earth co-located with a corresponding wireless sensor station 208. Co-located, as used herein, means disposed at a common location with one component being within a few feet (a few decimeters) of the other. Therefore, each sensor unit 320 may be coupled to a corresponding wireless station unit 316 by a relatively short cable 322, for example, about 1 meter in length or less, and/or coupled by integrating the sensor unit 320 with the wireless station unit 316 in a common housing 324, as shown in FIG. 3B, for example.

One or more of the sensors for use in the sensor unit 320 may be a multi-component sensor. The multi-component sensor includes a three-component accelerometer sensor incorporating micro-electro-mechanical systems (MEMS) technology and application-specific integrated circuits (ASIC), for example as found in the commercially available multi-component seismic sensors known by trade name VectorSeis Module (SVSM) available from Input/Output, Inc., of Stafford, Tex. The present disclosure, however, does not exclude the option of using velocity sensors such as a conventional geophone and/or using a pressure sensor such as a conventional hydrophone, in various illustrative alternative embodiments. Any sensor unit 320 capable of sensing seismic energy will provide one or more of the many advantages enabled by the various illustrative embodiments in accordance with the present disclosure. Furthermore, the present disclosure is useful in various illustrative embodiments using a single sensor unit 320, as shown in FIG. 3A, for example. Moreover, the present disclosure is also useful in various illustrative alternative embodiments where a sensor unit 320a may include multiple sensors 320k, where k may range from 1 to any finite integer, depending on the number of sensors 320k that may be included in the sensor unit 320a, as indicated in phantom in FIG. 3A, for example, the multiple sensors 320k interconnected by one or more strings 322a.

Figure 4:
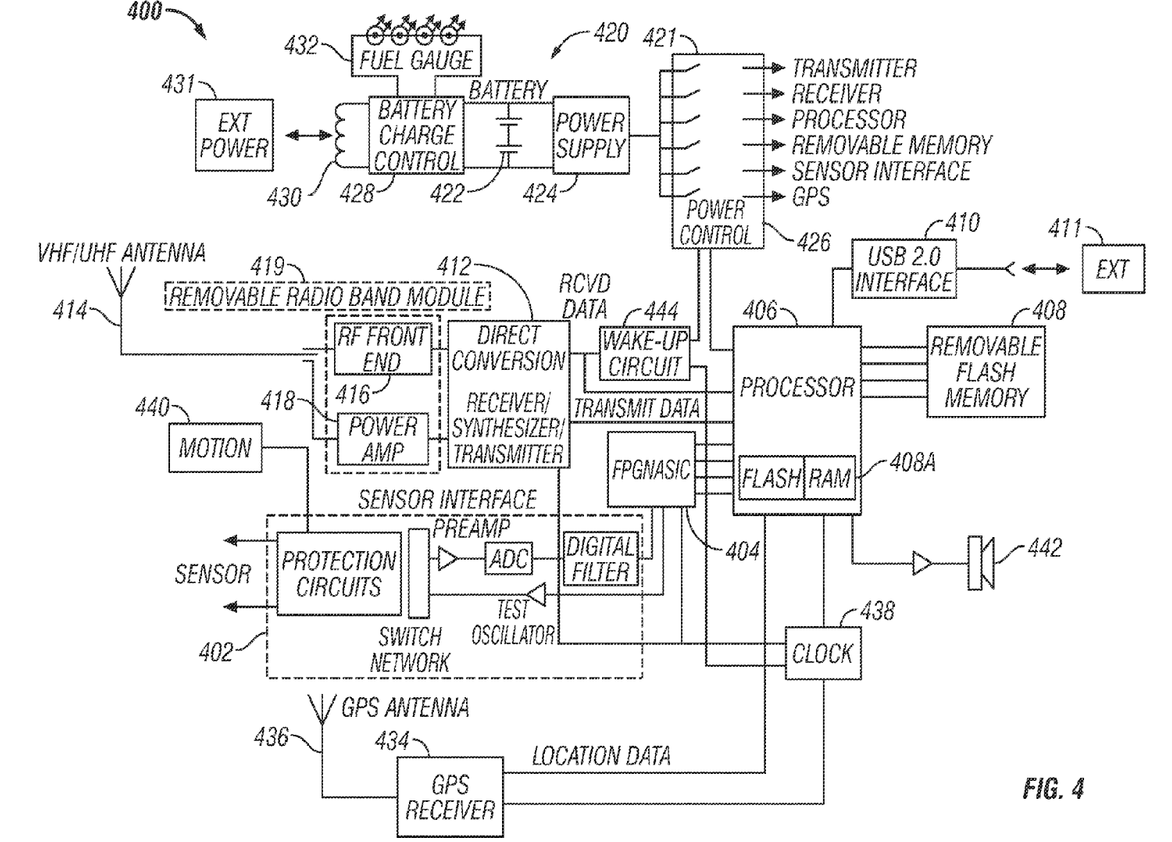
FIG. 4 schematically illustrates a wireless station unit incorporating exemplary circuitry to interface with an analog output sensor unit, according to one embodiment of the present disclosure.

FIG. 4 is a schematic representation of a wireless station unit 400 according to one embodiment of the present disclosure that operates as a data recorder incorporating circuitry to interface with an analog output sensor unit (not shown). The wireless station unit 400 is an acquisition device that may include a sensor interface 402 to receive an output signal from the sensor unit 320. The sensor interface 402 may include a protection circuit, switch network, a preamplifier, a test oscillator, and ADC and digital filtering circuits to pre-process the received signal, as shown in FIG. 4, for example. The sensor interface 402 may be controlled in part by a field-programmable gate array (FPGA) and/or an ASIC controller circuit 404. An on-board local processor 406 may process the signal to create storable information indicative of the seismic energy sensed at the sensor unit 320. The information may be in digital form for storage in one or more storage devices 408, 408a, also referred to herein as a memory unit. The memory unit 408, 408a may be a removable flash memory 408 and/or a dedicated random access memory (RAM) 408a, for example, with a coupling 410 for providing access to the stored information and/or for transferring the stored information to an external storage unit 411. The coupling 410 may be a cable coupling, such as a universal serial bus (USB) 2.0 interface, for example, and/or the coupling 410 may be an inductive coupling and/or an optical coupling. Such couplings 410 are known and, thus, are not described in further detail herein.

The memory unit 408, 408a may be a nonvolatile memory of sufficient capacity for storing information for later collection and/or transmission. The memory unit 408, 408a may be in the form of a memory card, a removable miniature hard disk drive, and the like. In various illustrative embodiments, memory unit 408, 408a may include one or more of the following: (i) a read-only memory (ROM), (ii) a programmable read-only memory (PROM), (iii) an electrically programmable read-only memory (EPROM), (iv) an electrically alterable read-only memory (EAROM), (v) an electrically erasable and programmable read-only memory (EEPROM), (vi) a flash memory, (vii) an optical disk, (viii) a hard drive, (ix) an iPod®, (x) a non-volatile read-write memory (NOVRAM), and the like.

A memory card, also known as a flash memory card or a storage card, is a small storage medium used to store digital information and is suitable for use in seismic prospecting. Flash memory is a type of nonvolatile memory that can be erased and reprogrammed in units of memory called blocks. Flash memory is a variation of an EEPROM, which, unlike flash memory, is erased and rewritten at the byte level. Thus, updating a flash memory is typically faster than updating an EEPROM.

In various illustrative embodiments, an interface with the central controller 202 may be accomplished with a communication device such as an on-board transmitter-receiver circuit 412 and an antenna 414 selected for the desired transmitting/receiving frequency to provide direct communication with the remotely-located central controller 202. The transmitter/receiver circuit 412, as shown in FIG. 4, for example, may be a direct-conversion receiver/synthesizer/transmitter circuit 412 and/or may, in the alternative, be implemented as a software-defined radio transceiver. Alternatively, in various illustrative embodiments, the transmitter/receiver circuit 412 may be any suitable circuit providing transceiver functions, such as a transceiver utilizing superheterodyne technology, for example. The antenna 414 may include a VHF/UHF antenna. Other circuitry may include a radio frequency (RF) front end circuit 416 and a power amplifier 418 for enhancing communication with the central controller 202. These circuits may advantageously be in the form of a removable radio band module 419 to allow operation over a broad frequency band when used with replaceable antennas 414. A direct-conversion radio transceiver 412 may provide the advantages of operation over a broad frequency band, allow smaller overall size for the station unit 400, and/or reduce overall weight for field-transportable units, such as the mobile unit 252j, for example.

Local power may be provided by a power supply circuit 420 that may include an on-board rechargeable battery 422. The on-board rechargeable battery 422 may be of any suitable chemistry and may be a nickel-metal hydride (NMH) rechargeable battery and/or a lithium-ion or lithium-polymer rechargeable battery of adequate size for the particular application, for example. The on-board rechargeable battery 422 may provide an output to a power supply 424 to condition and regulate power to downstream circuits and the power supply 424 output may be coupled to a power control circuit 426 for distributing power to various local components. The wireless station unit 400 may also include power management circuitry 421 that shifts the station unit 400 between one or more selected levels of power use: for example, a sleep mode wherein only "wake-up" circuitry 444 may be energized to a high-active mode wherein the sensor unit 320 can detect seismic energy.

The power circuit 420 further includes a charging device 428 and charger interface 430 for coupling the charging device 428 to an external power source 431. A charge indicator 432 provides an indication of amount of charge and/or charging time remaining for the power circuit 420. Such indicators are somewhat common and further description is not necessary here.

Location parameters (for example, X-coordinate, Y-coordinate, Z-coordinate, longitude, latitude, elevation, azimuth, inclination, and the like) associated with a particular wireless sensor station 316 may help to correlate seismic survey data acquired during a seismic survey. In various illustrative embodiments, these seismic survey parameters may be determined by a parameter-determining sensor, such as the navigation tool 254j of the mobile unit 252j, for example. These seismic survey parameters may be determined, in various illustrative embodiments, prior to a seismic survey using an expected sensor location and nominal sensor orientation and/or during a seismic survey and/or the seismic survey parameters may be adjusted according to the present disclosure. The location parameters may be stored in a memory 303, 408, 408a either in the central controller 202 and/or in the station unit 400. In one embodiment, the wireless sensor station includes a global positioning system (GPS) receiver 434 and associated antenna 436. The GPS receiver in this embodiment is shown coupled to the processor 406 and to a clock circuit 438 to provide location parameters such as position and location data for correlating seismic information and for synchronizing data acquisition. Alternatively, location parameters can be transmitted to and stored in the central controller and synchronization may be accomplished by sending signals over the VHF/UHF radio link independent of the GPS. Therefore, the on-board GPS may be considered an optional feature. Location parameters associated with sensor orientation can be determined by accelerometers and/or magnetic sensors and/or manually.

In one embodiment, the wake-up circuit 444 allows the wireless station unit to control power consumption from the battery throughout different operating modes. The wake-up circuit 444 can be triggered from two sources the radio receiver 412 or the clock 438. In a low power mode, for example, power is applied only to the radio receiver 412 and the wake-up circuit 444. If a specific wake-up command is transmitted over the radio and decoded by the wake-up circuit, other circuits such as the processor 406 will be enabled and come on-line to support further processing of commands and signals received from the sensor unit. Alternatively the wake-up circuit could energize the radio receiver 412 at predetermined time intervals as measured by signals received from the clock 438. At these intervals the radio receiver would be enabled briefly for receiving commands, and if none are received within the enabled time period, the receiver 412 will power down, either autonomously or by command from the wake-up circuit.

In one embodiment, the wireless station unit 400 further includes a motion sensor 440 to detect unwanted movement of the station unit or to detect around the station unit, in which a proximity sensor might be used. Such unwanted movement might be caused by wildlife interfering with the unit, soil movement or the like. Furthermore, the movement might be indicative of an attempted theft of the station unit. In the latter event, the wireless station unit might also include an audible alarm 442 to deter theft and to keep animals away from the station unit. Any unwanted movement will be detected by the motion sensor, and a motion sensor output is coupled to the unit by a dedicated interface, circuit, or the output can be integrated into the sensor interface. The motion sensor output is processed using, the on-board processor 406 and the processed output is transmitted via the on-board transmitter/receiver circuit 412 to the central controller to alert the operator of the unwanted movement. The GPS receiver output can be processed along with the motion sensor output. This enables tracking of the wireless sensor station unit in the event of theft.

In one embodiment, the function of motion sensing is accomplished with the same sensor unit 208 as is performing the seismic energy sensing function. In the embodiment described above and referring to FIG. 3B having the sensor unit integrated into the wireless station unit, the seismic sensor output will necessarily include components associated with the desired sensed seismic activity as well as sensed components associated with unwanted movement. The output is processed in conjunction with the output signal from the GPS receiver to indicate unwanted station movement. Thus, an output signal transmitted to the central controller 202 might include information relating to unwanted movement as well as seismic information, state of health information or other information relating to a particular wireless station unit 316 and/or sensor unit 320.

In several alternative, embodiments, methods of the present invention are used to sense, record and transfer information from a seismic sensor location to a central recorder. In one embodiment, a wireless station unit substantially as described above and shown in FIG. 4. Each wireless sensor station is transported to a predetermined spread location. Upon arriving at the location, viability of the location is determined in real time based on the terrain, obstacles borders etc. The location is adjusted where necessary and feasible. If adjusted, location parameters (e.g., latitude, longitude, azimuth, inclination, etc.) associated with the particular wireless sensor station so adjusted are determined and entered as updated system parameters. In one embodiment, these parameters are determined using a GPS receiver to determine the actual location of the planted sensor unit. Other parameters might be determined with a manual compass used by the crew or by one or more magnetometers in the sensor unit. Parameters might also be determined using multi-component accelerometers for determining orientation of the planted sensor unit. In one embodiment the updated system parameters are entered by the field crew in the wireless sensor station unit itself. In one embodiment, the updated system parameters are entered at the central controller. In another embodiment, the updated system parameters are entered automatically upon system activation and sensor station wake-up using location parameters and orientation parameters determined by a GPS receiver, accelerometers, magnetometers, and/or other sensors disposed in the station or sensor unit or both.

Referring to FIGS. 2-4, a system 200 according to the present disclosure includes a central controller 202 remotely located from a plurality of station units 208. Each station unit 208 includes a sensor unit 320 remotely located from the central controller 202. Each sensor unit 320 is coupled to the earth for sensing seismic energy in the earth, which might be natural seismic energy or energy produced from a seismic source 206. The sensor unit 320 provides a signal indicative of the sensed seismic energy and a recorder device 316 co-located with the sensor unit receives the signal stores information indicative of the received signal in a memory unit 408 disposed in the recorder device 316. A communication device 412 is co-located with the sensor unit and the recorder device for providing direct two-way wireless communication with the central controller.

In some embodiments, the receiver units utilize conventional lithium ion batteries provide about seventy to eighty hours of operating life for each unit. Since a given deployment can last over fifteen days, "unmanaged" power consumption by the sensor stations 208 can deplete the batteries within seven or so days. Unmanaged power consumption can include simply turning on the sensor stations 208 prior to operations and turning off the sensor stations 208 at the end of operations for a given day. This can cause the sensor stations 208 to be continuously draining the batteries for ten or more hours. Recharging the batteries can be labor-intensive and could delay or otherwise interfere with the data acquisition operations. Replacing batteries can also be labor intensive and additionally require a stock of replacement batteries, which also can be costly.

In various aspects, the present invention may also include power management methods and systems that optimize power consumption by above-described seismic data acquisition systems. These methods and systems enable the receiver units to operate throughout a given deployment with minimal, if any, battery replacements.

One exemplary power management method optimizes power consumption by automating one or more aspects of the interaction between the Central Station Computer (CSC) 250, one or more mobile units 252j, and the seismic spread 210. In one embodiment, the CSC 250 transmits data that enables one or more sensor stations 208 in the spread 210 to adjust power usage in a manner consistent with the firing of the sources 206i. The data can transmitted to a specific sensor station or group of sensor stations or transmitted in a "broadcast" fashion to the spread 210. In response to the transmitted data, the power management circuitry 421 of the sensor stations 208 places the receivers into the appropriate level of power use: e.g., a sleep mode, an intermediate power state, a high-active mode, etc.

An exemplary CSC 250 includes one or more processors programmed with instructions that controls firing of sources 206i in a predetermined sequence or progression. For instance, the CSC 250 controls firing initiation, the progression of firing and the time interval between firings. In one mode, a plurality of mobile units 252j each navigate to a separate source 206i. Each mobile unit 252j transmits a signal to the CSC 250 upon locating a source 206i. As discussed previously, the mobile unit 252j includes a source controller 256j that controls the firing of the sources 206i. In an exemplary operating mode, the source controller 256j determines the location (for example, the X-Y-Z coordinates) of the mobile unit 252j from the navigation tool 254j and transmits the coordinates to CSC 250. In response, the CSC 250 transmits status information to the source controller 256j, which can be presented visually or otherwise to the human operator. The status information can include the relative position of the mobile unit 252j in a queue of mobile units that have reported as ready to fire and expected time until firing commences. By "reporting," it is generally meant transmitting a data encoded signal, which can be a voice signal or a machine generated signal that can be processed by the CSC 250. When ready, the CSC 250 transmits an "arm" signal to instruct the mobile unit 252j to prepare the source for firing and then transmits a "fire" signal that instructs the source controller 256j to fire the source 206i. Optionally, a mobile unit 256j may simply maintain the source 206i in the "armed" position so that when the CSC 250 transmits the "fire" signal when it is ready, the source controller 254j immediately fires the source 206i.

The exchange of data between the mobile units 252j and the CSC 250 enables the CSC 250 to manage the queue of mobile units 252j that report as having found a source 206i. In accordance with programmed instructions, CSC 250 determines a progression of firing of the sources 206i, and transmits appropriate instructions data to the reporting mobile units 252j and the receiver spread 210.

In one power management scheme, the sensor stations 208 making up the spread 210 are divided, into defined sets of sensor stations. For convenience, a set of sensor stations 208 will be generally referred to as a template. Each template is associated with one or more sources 206i. While each template can include different sensor stations 208, such is not necessary the case. That is, some templates can share sensor stations 208. Referring to FIG. 2, there are shown three illustrative templates 215a, 215b, 215c. Templates 215a and 215h are composed of distinct sensor stations 208 whereas template 215c shares some sensor stations 208 with templates 215a and 215b. Additionally, a "super-template" or composite template can be formed through a union of individual templates. A template can be based on geometric shapes (e.g., circles, fans, squares), mathematical models that predict which sensor stations 208 will most efficiently detect seismic energy from a given source 206i, relative proximity or any other suitable methodology. Of course, in practical applications, a template can include tens or hundreds of sensor stations 208. In an exemplary simple arrangement, all the sensor stations 208 in a spread 210 are grouped together in a single template that is associated with every source 206i that is used. In an exemplary complex arrangement, a separate template is formed for each source 206i. The utility of the templates will be discussed below in connection with exemplary deployment modes.

In one illustrative deployment mode, the power usage of the sensor stations in a seismic spread is coordinated with the status and number of sources that prepared to "shoot" or fire. For instance, when a preset minimum number of sources report as being ready to fire, the sensor units transition from the sleep mode to a partial or full power mode. When the number of sources reporting as ready to fire drops below a preset minimum, the sensor units transition from a partial or full power mode to the sleep mode. For convenience, these two values will be referred to as a "wakeup" threshold value and a "sleep" threshold value, respectively.

Figure 5:
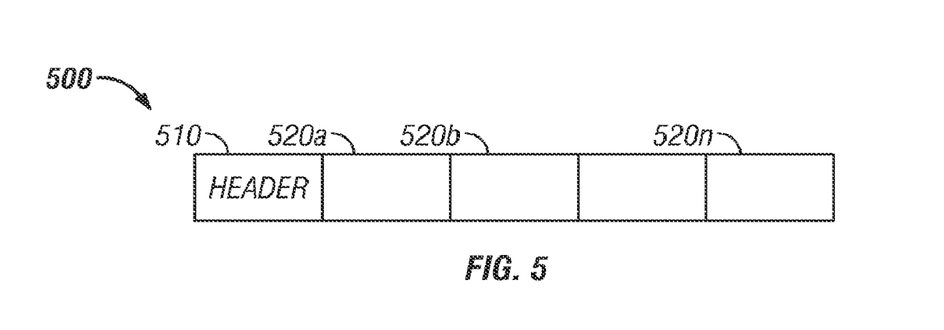
FIG. 5 shows an example of a trace block data or block data having a header that includes one or more parameters according to one embodiment of the present disclosure.

FIG. 5 shows an example of a data block (also referred to as trace block data or a trace) 500 that includes a header 510 and the digitized seismic signals data for a trace in the form of one or more samples, such as the samples designated by numerals 520a, 520b through 520n. The samples 520a-520n are separated by a suitable identifier. The header 510 includes a specified number of bytes, wherein different bytes or groups of bytes in the sequence represent specified features relating to the acquired seismic data. Formats for the trace header, such as the header 510 are defined by the Society of Exploration Geophysicists ("SEG"). The current format is referred to as the SEG-Y format. For the purpose of this disclosure any suitable header format may be utilized. However, for ease of explanation and understanding, the header is described herein in the SEG-Y format. The seismic data trace samples are prepared at the field acquisition and the data that is recorded by the field acquisition unit includes a header.

The data recorded by the data acquisition units in the cable system, such as the system of FIG. 1, is typically transmitted to a central recorder over a direct link, such as a copper wire, optical fiber, etc. In the wireless system, such as shown in FIG. 2, the data recorded by the data acquisition unit is gathered and transcribed at a collection center and after transcription the data is stored on a suitable high density medium and sent to a processing center for further processing. The header for each trace block includes selected source and receiver parameters and may include all parameters that are desired to make each data block process ready at the data acquisition units. The data received from the data acquisition units in prior system is not process ready or near process ready. The data needed for processing typically originates from different systems and field operations thus creating an error prone time consuming effort to arrive at the process ready data, The data needed for In the present header the data may include information such as: trace sequence number within a line and within a reel; original field record number and the trace number within the field record; trace identification code; number of vertically summed traces; number of horizontally summed traces; weathering and subweathering velocity; number of samples in the trace; gain and gain constants; actual or planned source information or parameters, such as source position parameters (x-, y- and z-coordinates); source depth; charge type and size for a dynamite source; sweep parameters (frequency and amplitude), length of the sweep, number of sweeps at source point; uphole time, type of sweep (linear or non-linear), taper of the sweep at the beginning and end of the sweep for a vibratory type energy source. In addition the header may include parameters such as azimuth and/or orientation of the receivers, distance from the source point to the receiver, actual uphole time recorded in the field, etc. In one aspect, in the systems and methods disclosed herein, one or more such source parameters and/or receiver parameters are integrated into the header at the data acquisition units. In another aspect the source, receiver and other selected parameters are integrated into each trace header at the data acquisition units so that all the data received from the array is process ready or near process ready, avoiding the integration of such parameters at a later point in time. Such process-ready or near process ready data may be recorded in the data recording units for later retrieval or transmitted from the data acquisition units to a central data collection unit or a central recording or other unit, substantially as the seismic data is being acquired in the field. The transmission may be done via cables, such as in the system shown in FIG. 1, or wirelessly, such as in the system shown in FIG. 2. Examples of data flow for integrating the source, receiver and other parameters into the header at the data acquisition units are shown and described below in reference to FIG. 6.

Figure 6:
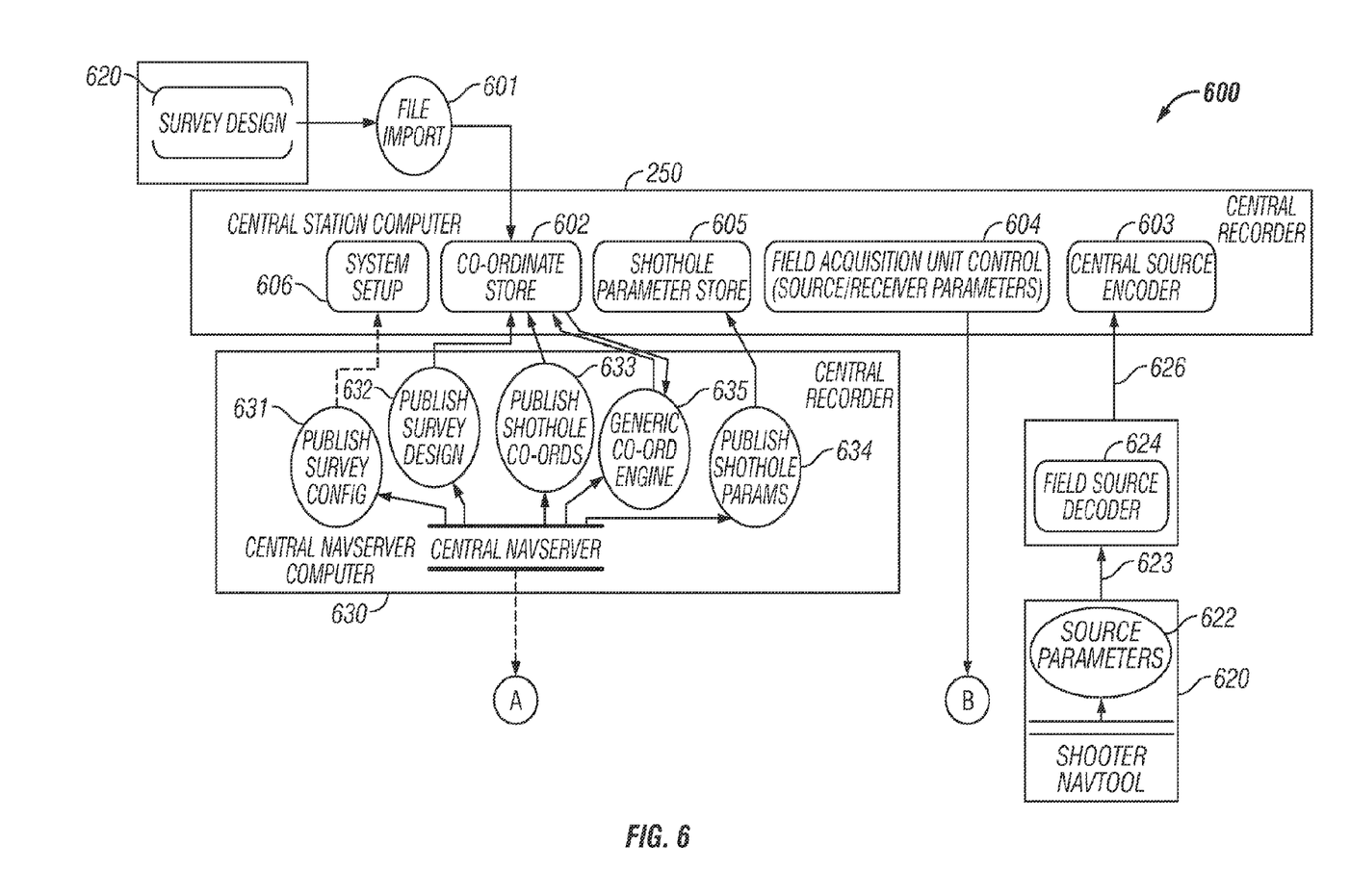
FIG. 6 schematically illustrates a high-level dataflow for a seismic surveying system that incorporates certain features and aspects according to one embodiment of the present disclosure.

FIG. 6 schematically illustrates a high-level dataflow 600 for a seismic surveying system, such as system 100 (FIG. 1) and 200 (FIG. 2), that may be utilized to incorporate parameters into a trace header at the data acquisition unit during acquisition of seismic data according to one aspect of the disclosure. Prior to performing a seismic survey, a survey plan or design 602 is made that includes a variety of features, including but not limited to the array configuration, location of each sensor, location of each source point, type of the source, and other source and receiver parameters useful or necessary for acquiring or processing seismic data. The location or position may include x-, y- and z-coordinates. The z-coordinate (elevation) may be obtained form an arial or another suitable survey. The plan design parameters are provided to the CSC 250 and stored as shown by block "coordinate store" 604.

Once the seismic sensors are placed on the survey area, the actual location of some sensors or sources may or may not be the same as provided by the design 602. If the data acquisition unit 650 includes a GPS device, then the data acquisition unit records the actual x- and y-coordinates for each receiver associated with the data acquisition unit. Otherwise, a portable navigation tool, referred to herein as the "Layout Navtool" 610, may be used by a field personnel to identify the receiver (for example by its serial number or another identifier) 612 and to determine and record the actual x-, y- and z-coordinates of the receiver. The z-coordinate may be obtained from the prior survey, such as light detection and ranging (LiDAR) or suitable digital elevation model (DEM), etc. Also, the azimuth and/or orientation of the receiver may be recorded by the Layout Navtool. The Layout Navtool also may be used to record the depth of each receiver, if the receiver is buried or under water. The Layout Navtool transfers or provides the recorded receiver parameters 614 to the data acquisition unit 650. The layout Navtool may communicate with the data acquisition unit 650 by any suitable link 616 which may be a direct wire connection or a wireless link, such as Bluetooth.

Another navigation tool (typically a portable unit), referred to herein as the "Shooter Navtool," 620 may be used by a field personnel to record the actual source location parameters and other parameters such as the source type and size of the source, in the cases of an explosive source. Other parameters, such as uphole time, etc. may also be recorded. The Shooter Navtool transmits the recorded source data 622 to an intermediate location, which may be a source decoder 624 in the field, via a suitable link 623. The decoder 624 decodes the Shooter Navtool provided parameters for use by the CSC 250 and transmits the decoded data to an encoder via a suitable link 626, which may be an RF link.

The CSC 250 receives the source parameters 622 from encoder 624 and an stores such parameters and provides such parameters to a central navigation server 630. A field acquisition controller 604 at the CSC 250 transmits the source parameters 622 received from the Shooter Navtool 620 and other source and receiver parameters to each field data acquisition unit 650 and also sends various commands relating to the field units operations. The central navigator server 630 manages the field operations, captures information about navigational aspects of the field survey system and provides real-time command and control to field personnel. The central navigation server 630 may be a knowledge-based system that interacts with the CSC 250. The central navigation server 630 publishes or provided survey configuration 631 (files used to set up field acquisition units), publishes survey design 632, shot hole or vibrator coordinates 633 and shot hole or vibrator parameter 634. The CSC 250 stores the shot hole parameters 622 received from the Shooter Navtool 620 and shot hole parameters 634 provided by the central navigation tool 630. In addition, the CSC 250 and the central navigation server 630 communicate to the survey system setup 606, which setup that may include features such as instructions to operate the various field data acquisition units 650, the manner in which the units 650 should operate, such as the data cycle, sleep mode, awake mode, timing relating to acquiring of data etc. Thus, in general the source and sensor parameter may be provided to each data acquisition unit 650 from any suitable source and by any suitable link. Such source may include portable recording devices, such as Layout Navtool and Shooter Navtool and a central control unit such as CSC 250 or any combination thereof.

Upon firing of a source, data acquisition units 650 start to receive seismic signals for their associated sensors, digitize the received signals corresponding to each trace and arrange them into appropriate samples. The data acquisition units provide as an output a trace data block for each trace that includes a header with integrated source and/or receiver parameters in the manner described above. The data acquisition units 650 record or store the data blocks in a suitable storage medium, such as a solid state memory. In one aspect the stored trace data blocks may be retrieved or downloaded from each data acquisition unit into a field data collection unit 655. Each field data collection unit 655 is typically capable of downloading seismic data from multiple data acquisition units.

In another aspect, each data acquisition unit 650 may transmit the stored tracer block data to a staging data collection unit 660 via a link 652, which may be a wired or a wireless link (such as a cable link or an RF link). In one aspect, the staging data collection unit 660 may compile the received trace block data from one or more data acquisition units 650 and store the collected data in a mass storage medium, such as a tape or hard drive, which is then transported to a processing unit 670. The data also may be transmitted to the processing unit 670 by a suitable link, such as an Ethernet or a wireless link. The unit 670 processes the data to provide a seismic data volume which may be utilized to obtain the 2-dimensional, 3-dimensional and/or 4-dimensional maps of the substructures, in one aspect, the tracer data blocks received by the staging data collection unit 660 are process ready or near process ready. Therefore the data received by the processing unit also is process ready. In such instance, substantially all of the desired information is integrated into each tracer header. Such data typically does not go through integration of seismic survey parameters past the data acquisition units 650. In another aspect, however, some data integration into the trace headers may be performed at the staging data collection unit 660 by a transcriber 662 or another compiler and then stored onto the desired mass data storage medium. The staging data collection unit 660 or the individual data recoding units 650 may be configured to transmit the seismic data directly to the processing unit 270 or via an intermediate repeater As described above, the disclosure in one aspect provides a method of acquiring seismic data that comprises: receiving a seismic signal detected by at least one sensor in response to a seismic energy signal generated by a source at a selected location at a data acquisition unit in data communication with the sensor; receiving at least one parameter of the source at the data acquisition unit; generating a data block at the data acquisition unit having data representative of the received seismic signal and a header that contains data representative of the at least one parameter of the source; and storing the generated data block on a suitable medium. The parameter of the source may be selected from a group consisting of: (i) an x-coordinate of the selected source location; (ii) a y-coordinate of the selected source location; (iii) an elevation of the selected; (iv) a source identification; (v) a depth of the source relative to a datum; (vi) a size of a source charge; (vii) an whole time corresponding the selected location; (viii) a frequency of a vibrator source; (ix) an amplitude of a vibrator source; (x) a sweep length of a vibrator source; (xi) number of sweeps made by a vibrator source; (xii) a sweep taper for a vibrator source; (xiii) shape of a sweep of a vibrator source; and (xiv) source type. The data acquisition unit may receive the source parameters from a central system computer in data communication with the data acquisition unit or a portable unit in data communication with the data acquisition unit. The method also may transfer the data block from the data acquisition unit to a remote unit wirelessly that receives data blocks from a plurality of data acquisition units or a portable device that downloads the data blocks from the data acquisition units. The data blocks from the various data acquisition units is gathered and processed to obtain seismic maps of the earth subsurface. The method may further integrate sufficient parameters relating to the receiver and the source to generate the data block that is substantially process-ready for providing a seismic map of an earth subsurface.

In another aspect, a seismic data acquisition system is provided that may include: at least one receiver placed at selected location on a survey area for receiving seismic signals in response to energy induced into the earth by a source; a data acquisition unit coupled to the at least one receiver for processing signals received from the at least one receiver; a remote unit that transmits a plurality of source parameters to the data acquisition unit; and wherein the data acquisition unit generates data blocks, wherein each data block includes data representative of the received seismic signals and a header that contains data representative of the at least one parameter of the source. The data acquisition unit transfers the data blocks to a remote unit wirelessly or to a portable unit that downloads the data blocks from the data acquisition unit. The at least one parameter of the source may be an actual value measured at the selected location of the source or the planned location. A computer system communicates with the data acquisition unit wirelessly to provide the source parameters thereto. Receiver parameters may be provided to the data acquisition unit by a portable device that obtains such parameters proximate the receiver location.

In another aspect, a data acquisition unit is provided that includes: a circuit or an interface adapted to be coupled to a seismic sensor for receiving a seismic signal detected by a sensor in response to a seismic energy signal generated by a seismic energy source; a circuit or an interface for receiving at least one parameter of the source from a remote device; a processor that generates a data block that includes data representative of the received seismic signal and a header that contains data representative of the at least one parameter of the source; and a data storage device that stores the generated data block. The data acquisition unit may further include a circuit that receives at least one parameter of the receiver wirelessly and wherein the processor integrates the at least one parameter of the receiver into the header of the data block.

Additionally, a computer program is provided that includes: a set of instructions to receive seismic signals from a sensor during acquisition of seismic signals generated in response to activation of a seismic source; a set of instructions to receive at least one seismic source or receiver parameter from are device wirelessly; a set of instructions to generate at least one data that includes data representative of the received seismic signals and a header that contains data representative of the at least one parameter of the source or the receiver; and a set of instructions to store the at least one data block on a data storage medium. The computer program may further include a set of instructions to transfer the at least one data block to a device wirelessly. The computer program may further include a set of instructions to receive at least one receiver parameter wirelessly and to integrate the at least one receiver parameter in the header of the data block.

The disclosure also provides a method of acquiring seismic data that comprises: receiving a seismic signal detected by at least one sensor in response to a seismic energy signal generated by a source at a selected location at a data acquisition unit in data communication with the sensor; receiving at least one parameter of location of the receiver at the data acquisition unit; generating a data block at the data acquisition unit having data representative of the received seismic signal and a header that contains data representative of the at least one parameter of the receiver; and storing the generated data block on a suitable medium. The at least one parameter of the receiver is selected from a group consisting of: (i) an x-coordinate of the receiver location; (ii) a y-coordinate of the receiver location; (iii) an elevation of the selected location: and (iv) a depth of the receiver relative to a datum. The parameter of the receiver may be received from a remote unit which may be a central system computer in data communication with the data acquisition unit or a portable unit in data communication with the data acquisition unit. The parameter of the receiver may be received at the data acquisition unit wirelessly. The data block from the data acquisition unit may be transferred to a remote unit wirelessly that receives data blocks from a plurality of data acquisition units or to portable device that downloads the data block from the data acquisition unit. The transferred data blocks are processed to provide seismic maps.

The particular embodiments disclosed above are illustrative only, as the present claimed subject matter may be modified and practiced in different but equivalent manners apparent to those skilled in the art having the benefit of the teachings herein. It is therefore evident that the particular illustrative embodiments disclosed above may be altered or modified and all such variations are considered within the scope and spirit of the present claimed subject matter. The disclosure is not intended to be used to limit the scope of the claims. Also, the abstract and summary are provided to merely aid the readers to understand the disclosed embodiments or to meet certain format requirements and are thus not to be used in any way to limit the scope of the claims.

What is claimed is:

1. A method of acquiring seismic data, comprising:
using a portable tool to record at least one source parameter relating to a source configured to generate a seismic energy signal;
transmitting the at least one source parameter to a central station computer;
receiving at a data acquisition unit, after the data acquisition unit has been positioned, the at least one source parameter;
receiving at the data acquisition unit a seismic signal detected by at least one sensor in response to a seismic energy signal generated by the source at a selected source location, the data acquisition unit being in data communication with the at least one sensor;
generating a data block at the data acquisition unit having data representative of the received seismic signal and a header that contains data representative of the at least one source parameter; and
storing the generated data block on a storage medium.

2. The method of claim 1, wherein the at least one source parameter is selected from a group consisting of: (i) an x-coordinate of the selected source location; (ii) a y-coordinate of the selected source location; (iii) an elevation of the selected source; (iv) a source identification; (v) a depth of the source relative to a datum; (vi) a size of a source charge; (vii) an uphole time corresponding to the selected location; (viii) a frequency of a vibrator source; (ix) an amplitude of a vibrator source; (x) a sweep length of a vibrator source; (xi) a number of sweeps made by a vibrator source; (xii) a sweep taper for a vibrator source; (xiii) a shape of a sweep of a vibrator source; and (xiv) a source type.

3. The method of claim 1, wherein receiving the at least one source parameter comprises receiving the at least one source parameter from a remote unit that is one of: (i) a central system computer in data communication with the data acquisition unit and (ii) a portable unit in data communication with the data acquisition unit.

4. The method of claim 1, further comprising:
transferring the data block from the data acquisition unit to one of: (i) a remote unit that wirelessly receives data blocks from a plurality of data acquisition units and (ii) a portable device that downloads the data block from the data acquisition unit.

5. The method of claim 1, further comprising:
receiving at least one parameter of the at least one sensor at the data acquisition unit and integrating the at least one sensor parameter in the header.

6. The method of claim 5, further comprising:
integrating the at least one sensor parameter and the at least one source parameter to generate the data block that is substantially process ready for providing a seismic map of an earth subsurface.

7. A non-transitory computer-readable medium product having a program thereon that, when executed, cause at least one processor to execute a method, the method comprising:
recording at least one source parameter relating to a source configured to generate a seismic energy signal that was obtained by a portable tool;
transmitting the at least one source parameter to a central station computer;
receiving at the data acquisition unit, after the data acquisition unit has been positioned, at least one source parameter from a source configured to generate a seismic energy signal;
receiving at a data acquisition unit a seismic signal detected by at least one sensor in response to a seismic energy signal generated by the source at a selected source location, the data acquisition unit being in data communication with the at least one sensor;
generating a data block at the data acquisition unit having data representative of the received seismic signal and a header that contains data representative of the at least one source parameter; and
storing the generated data block on a storage medium.

8. The non-transitory computer-readable medium product of claim 7, further comprising at least one of: (i) a read-only memory (ROM), (ii) a programmable read-only memory (PROM), (iii) an electrically programmable read-only memory (EPROM), (iv) an electrically alterable read-only memory (EAROM), (v) an electrically erasable and programmable read-only memory (EEPROM), (vi) a flash memory, (vii) an optical disk, (viii) a hard drive, and (ix) a non-volatile read-write memory (NOVRAM).

* * * * *